United States Patent
Hong et al.

(10) Patent No.: US 11,873,425 B2
(45) Date of Patent: Jan. 16, 2024

(54) ADHESIVE COMPOSITION AND ADHESIVE FILM INCLUDING CURED PRODUCT THEREOF

(71) Applicant: LG Chem, Ltd., Seoul (KR)

(72) Inventors: Jae Sung Hong, Daejeon (KR); Ho Kyung Song, Daejeon (KR); Sle Lee, Daejeon (KR); Jun Man Choi, Daejeon (KR); Jang Soon Kim, Daejeon (KR)

(73) Assignee: LG Chem, Ltd.

( * ) Notice: Subject to any disclaimer, the term of this patent is extended or adjusted under 35 U.S.C. 154(b) by 326 days.

(21) Appl. No.: 16/648,106

(22) PCT Filed: Oct. 19, 2018

(86) PCT No.: PCT/KR2018/012372
§ 371 (c)(1),
(2) Date: Mar. 17, 2020

(87) PCT Pub. No.: WO2019/078656
PCT Pub. Date: Apr. 25, 2019

(65) Prior Publication Data
US 2020/0255691 A1  Aug. 13, 2020

(30) Foreign Application Priority Data
Oct. 20, 2017 (KR) .................. 10-2017-0136849

(51) Int. Cl.
*C09J 4/00* (2006.01)
*C09J 7/10* (2018.01)

(52) U.S. Cl.
CPC . *C09J 4/00* (2013.01); *C09J 7/10* (2018.01); C09J 2433/00 (2013.01)

(58) Field of Classification Search
CPC ... C09J 4/00; C09J 7/10; C09J 2433/00; C09J 7/00; C09J 2301/312
See application file for complete search history.

(56) References Cited

U.S. PATENT DOCUMENTS

| | | | |
|---|---|---|---|
| 2002/0142158 A1 | 10/2002 | Ono et al. | |
| 2011/0014409 A1* | 1/2011 | Wada | C09D 183/04 428/41.8 |
| 2011/0112249 A1 | 5/2011 | Takarada et al. | |
| 2012/0183769 A1 | 7/2012 | Nasu et al. | |
| 2013/0015909 A1 | 1/2013 | Kim et al. | |
| 2014/0011022 A1* | 1/2014 | Ukei | B32B 27/308 428/354 |
| 2014/0039128 A1* | 2/2014 | Shigetomi | C09J 133/14 525/303 |
| 2014/0065416 A1* | 3/2014 | Niwa | B32B 27/308 156/701 |

FOREIGN PATENT DOCUMENTS

| | | |
|---|---|---|
| CN | 102482546 A | 5/2012 |
| CN | 102791817 A | 11/2012 |
| JP | 2002285105 A | 10/2002 |
| JP | 2008239872 A | 10/2008 |
| KR | 20110051150 A | 5/2011 |
| KR | 20110111826 A | 10/2011 |
| KR | 20120096462 A | 8/2012 |
| KR | 20120134950 A | 12/2012 |
| KR | 20130031209 A | 3/2013 |
| KR | 20140102118 A | 8/2014 |
| KR | 20160011785 A | 2/2016 |
| KR | 20160015474 A | 2/2016 |
| KR | 20160039063 A | 4/2016 |
| TW | 201113342 A | 4/2011 |
| WO | 2011115224 A1 | 9/2011 |

OTHER PUBLICATIONS

Translation for WO-2013103065-A1, Kurata et a;, Jul. 2013 (Year: 2013).*
Bearch Report for Chinese Application No. 201880054231.7 dated Sep. 23, 2021. 2 pgs.
International Search Report for Application No. PCT/KR2018/012372 dated Apr. 11, 2019, 2 pages.
Taiwan Search Report for Application No. 107136848, dated Mar. 20, 2020, 1 page.

* cited by examiner

*Primary Examiner* — Nathan L Van Sell
(74) *Attorney, Agent, or Firm* — Lerner David LLP

(57) ABSTRACT

An adhesive composition and an adhesive film including a cured product thereof is provided.

7 Claims, No Drawings

ADHESIVE COMPOSITION AND ADHESIVE FILM INCLUDING CURED PRODUCT THEREOF

CROSS REFERENCE TO RELATED APPLICATIONS

The present application is a national stage entry under 35 USC § 371 of PCT/KR2018/012372 filed on Oct. 19, 2018, which claims priority to Korean Patent Application No. 10-2017-0136849 filed in the Korean Intellectual Property Office on Oct. 20, 2017, the entire contents of which are incorporated herein by reference.

TECHNICAL FIELD

The present invention relates to an adhesive composition and an adhesive film including a cured product thereof.

BACKGROUND ART

Various optical members may be attached to a display device by adhesive films. The adhesive film needs to maintain adhesive property for a long period of time even though the display device is exposed to the external environment. Accordingly, studies have been actively conducted in order to improve the adhesive property of the adhesive film.

In particular, when the adhesive film is applied to a small-sized display device such as a smart display, it is a recent technical trend to minimize the total thickness of the display device in response to recent consumers' demands to prefer display devices having a small thickness.

In general, in a cover member of the display device, a printed layer having a step may be separately formed in order to distinguish a display part from a bezel region. However, in this case, there is a problem in that as an air gap is formed between a cover member and a display member by the step caused by the printed layer, the total thickness of the display device is increased.

Accordingly, as part of a method for minimizing the total thickness of the display device, there has emerged a direct bonding method in which an air gap is not formed between a cover member and a display member by directly embedding an adhesive film between the cover member and the display member.

That is, there has emerged a method capable of reducing the total thickness of the display device and simultaneously securing adhesive strength between the cover member and the display member by sufficiently embedding a step in which an adhesive film is formed on the members.

Further, when a product having a defect such as an alignment problem is discarded during a process of manufacturing a display device by attaching the cover member and the display member, economic loss including environmental pollution caused by waste occurs, and when a relatively inexpensive adhesive film can be easily removed, reworkability can be improved because expensive parts can be recycled.

However, an adhesive film including a cured product of an adhesive composition in the related art includes a problem of change over time, in which a gel content is increased over time such that an adhesive property deteriorates. That is, since the adhesive property of the adhesive film in the related art is changed over time, a step formed between the cover member and the display member cannot be sufficiently embedded, so that there is a problem in that a lifting phenomenon occurs between the cover member and the display member.

In addition, the adhesive film in the related art has a problem in that during a process of removing the adhesive film after attaching a cover member and a display member, residues remain on the members, and as a result, the reworkability deteriorates.

Thus, there is a need for studies on an adhesive composition capable of providing an adhesive film which can be easily reworked while improving attaching strength between a cover member and a display member by sufficiently embedding a step between the cover member and the display member.

PROIR ART DOCUMENT

Patent Document

Korean Patent Application Laid-Open No. 10-2016-0011785

DETAILED DESCRIPTION OF THE INVENTION

Technical Problem

The present invention has been made in an effort to provide an adhesive composition and an adhesive film including a cured product thereof.

However, a problem to be solved by the present invention is not limited to the aforementioned problem, and the other problems that are not mentioned may be clearly understood by a person skilled in the art from the following description.

Technical Solution

An exemplary embodiment of the present invention provides an adhesive composition including an alkyl group-containing (meth)acrylate monomer, a cycloalkyl group-containing (meth)acrylate monomer, a carboxyl group-containing monomer, and an amine group-containing monomer, in which the amine group-containing monomer is included in a content of 1 part by weight or more and 10 parts by weight or less based on 100 parts by total weight of monomers.

Another exemplary embodiment of the present invention provides an adhesive film including a cured product of the adhesive composition.

Still another exemplary embodiment of the present invention provides an adhesive film prepared by using the adhesive composition.

An exemplary embodiment of the present invention provides a multilayer adhesive sheet sequentially including: a first outer adhesive film; an intermediate adhesive film; and a second outer adhesive film, in which the intermediate adhesive film includes the adhesive film.

Advantageous Effects

An exemplary embodiment of the present invention can provide an adhesive film which has an advantage of being sufficiently embedded in a substrate having a high step.

The adhesive film according to an exemplary embodiment of the present invention can maintain an excellent adhesive property even though the adhesive film is left to stand under extreme conditions of high temperature and high humidity.

The adhesive film according to an exemplary embodiment of the present invention has an excellent performance of suppressing white turbidity.

Even though the adhesive film according to an exemplary embodiment of the present invention is removed after being attached to an adherend, the adhesive film is easily reworked because a residue rarely remains on the adherend.

The adhesive property of the adhesive film according to an exemplary embodiment of the present invention can be maintained without deteriorating even after time elapses.

The multilayer adhesive sheet according to an exemplary embodiment of the present invention has advantages of exhibiting high step embeddability and simultaneously having high reworkability.

Further, since the multilayer adhesive sheet according to an exemplary embodiment of the present invention has high punchability, it is possible to minimize the error at the time of cutting the multilayer adhesive sheet.

[Best Mode]

When one part "includes" one constituent element in the present specification, unless otherwise specifically described, this does not mean that another constituent element is excluded, but means that another constituent element may be further included.

In the present specification, the unit "part by weight" may mean a weight ratio between the respective components.

In the present specification, the term "(meth)acrylate" may mean acrylate or methacrylate.

In the present specification, the term "repeating unit derived from a monomer" may mean a form in which the monomer forms a skeleton of the polymer, for example, a main chain or a side chain by being subjected to a polymerization reaction.

In the present specification, the term "monomer" may mean a unit body for forming a polymer, and may mean a prepolymer consisting of the same repeating unit.

In the present specification, the thickness of a certain member may be an average value of measured values of arbitrary 10 points obtained by measuring the cross section of the member with a thickness gauge or observing the cross section of the member with an optical microscope. When the thickness of the member is very small, the thickness may be measured by enlarging a photograph observed at high magnification, and may be measured by employing, as a boundary line, a central portion obtained by bisecting an interlayer interface line in a width direction at the time of enlarging the photograph.

In the present specification, the term "alkyl group" may mean those including a carbon chain structure in which an unsaturated bond is not present in a functional group, and may mean those including a straight-chained or branched carbon chain structure having 1 to 20 carbon atoms.

In the present specification, a cycloalkyl group may mean those including a carbon ring structure in which an unsaturated bond is not present in the functional group, and may mean those including a monocyclic ring or polycyclic ring having 2 to 20 carbon atoms.

In the present specification, the term "gel content" may mean a value obtained through the following Equation 2.

$$\text{Gel content (\%)}=(C-B)/A \quad \text{[Equation 2]}$$

In Equation 2,

A is a weight of a test specimen cut into a size of 5 cm×5 cm, which is measured by a difference in weight between a bottle which is made of a polyethylene material and contains the test specimen, and an empty bottle which is made of a polyethylene material, B means a weight of an iron network cut into a size of 14 cm×14 cm, and C means a weight measured after the test specimen contained in the polyethylene bottle is expanded with ethyl acetate at room temperature (25° C.) for 24 hours and filtered with an iron network, and then the iron network containing the residue of the test specimen is dried at a constant temperature condition of 110° C. for 2 hours.

Hereinafter, the present specification will be described in more detail.

An exemplary embodiment of the present invention provides an adhesive composition including an alkyl group-containing (meth)acrylate monomer, a cycloalkyl group-containing (meth)acrylate monomer, a carboxyl group-containing monomer, and an amine group-containing monomer, in which the amine group-containing monomer is included in a content of 1 part by weight or more and 10 parts by weight or less based on 100 parts by weight of the total monomer.

According to an exemplary embodiment of the present invention, the adhesive composition may include an alkyl group-containing (meth)acrylate monomer, a cycloalkyl group-containing (meth)acrylate monomer, a carboxyl group-containing monomer, and an amine group-containing monomer.

Specifically, the adhesive composition may form an optically clear form by including the alkyl group-containing (meth)acrylate monomer, the cycloalkyl group-containing (meth)acrylate monomer, and the carboxyl group-containing monomer. Accordingly, there is an advantage in that the adhesive composition may be applied to display devices in various fields.

Further, according to an exemplary embodiment of the present invention, the adhesive composition may not include a hydroxyl group-containing monomer.

An adhesive composition in the related art may suppress occurrence of white turbidity by including: an alkyl group-containing (meth)acrylate monomer; a cycloalkyl group-containing (meth)acrylate monomer; and a carboxyl group-containing monomer and a hydroxyl group-containing monomer. However, the adhesive composition in the related art has a problem of change over time in that the hydroxyl group (—OH) of the hydroxyl group-containing monomer and the carboxyl group (—COOH) of the carboxyl group-containing monomer react with each other to form a cured product, and as a result, the adhesive property deteriorates over time.

Thus, the adhesive composition according to an exemplary embodiment of the present invention does not include the hydroxyl group-containing monomer, and includes an amine-group containing monomer instead of the hydroxyl group-containing monomer. Accordingly, the adhesive composition according to an exemplary embodiment of the present invention has an advantage in that it is possible to suppress occurrence of white turbidity, and simultaneously, to solve the above-described problem of change over time.

According to an exemplary embodiment of the present invention, the alkyl group-containing (meth)acrylate monomer may be in a form in which the above-described alkyl group is bonded to (meth)acrylate.

According to an exemplary embodiment of the present invention, the alkyl group-containing (meth)acrylate monomer may implement structural stability of the adhesive composition by serving as a base monomer in the adhesive composition.

According to an exemplary embodiment of the present invention, the alkyl group-containing (meth)acrylate monomer may include at least one of methacrylate, methyl(meth) acrylate, ethyl(meth)acrylate, n-propyl(meth)acrylate, isopropyl(meth)acrylate, n-butyl(meth)acrylate, t-butyl(meth) acrylate, sec-butyl(meth)acrylate, pentyl(meth)acrylate, 2-ethylhexyl(meth)acrylate, 2-ethylbutyl(meth)acrylate, n-octyl(meth)acrylate, and isooctyl (meth)acrylate. However, the alkyl group-containing (meth)acrylate monomer is not limited thereto, and may be appropriately selected among those known in the art as long as the alkyl group-containing (meth)acrylate monomer is a (meth)acrylate monomer in which the above-described alkyl group is bonded to one side thereof.

According to an exemplary embodiment of the present invention, the cycloalkyl group-containing (meth)acrylate monomer may be in a form in which the above-described cycloalkyl group is bonded to (meth)acrylate.

According to an exemplary embodiment of the present invention, the cycloalkyl group-containing (meth)acrylate monomer may mediate a polymerization reaction of the alkyl group-containing (meth)acrylate monomer and the carboxyl group-containing monomer, and accordingly, may implement structural stability and an excellent adhesive property of the adhesive composition.

According to an exemplary embodiment of the present invention, the cycloalkyl group-containing (meth)acrylate monomer may include at least one of cyclohexyl acrylate (CHA), cyclohexyl methacrylate (CHMA), isobornyl acrylate (IBOA), isobornyl methacrylate (IBOMA), isobornyl methyl (meth) acrylate, and 3,3,5-trimethylcyclohexylacrylate (TMCHA). However, the cycloalkyl group-containing (meth)acrylate monomer is not limited thereto, and may be appropriately selected among those known in the art as long as the cycloalkyl group-containing (meth)acrylate monomer is a (meth)acrylate monomer in which the above-described cycloalkyl group is bonded to one side thereof.

According to an exemplary embodiment of the present invention, the adhesive composition may include a carboxyl group-containing monomer.

Specifically, the adhesive composition may implement a high adhesive property by including the carboxyl group-containing monomer.

Further, according to an exemplary embodiment of the present invention, the adhesive composition may not include a hydroxyl group-containing monomer.

The adhesive composition may not include the hydroxyl group-containing monomer, thereby suppressing a problem of change over time in which an adhesive property is changed even under extreme conditions of high temperature and high humidity.

Specifically, the adhesive composition further includes an amine group-containing monomer instead of a hydroxyl group-containing monomer which the existing adhesive composition usually includes, and thus has an advantage in that it is possible to suppress a change characteristic over time and occurrence of white turbidity.

According to an exemplary embodiment of the present invention, the carboxyl group-containing monomer may include at least one of acrylic acid, methacrylic acid, 2-(meth)acryloyloxy acetic acid, 3-(meth)acryloyloxy propyl acid, 4-(meth)acryloyloxy butyl acid, and an acrylic acid dimer, but is not limited thereto.

The hydroxyl group-containing monomer may include at least one of 2-hydroxyethyl(meth)acrylate, 2-hydroxypropyl (meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate, and 2-hydroxypropyleneglycol(meth)acrylate, but is not limited thereto.

According to an exemplary embodiment of the present invention, the alkyl group-containing (meth)acrylate monomer, the cycloalkyl group-containing (meth)acrylate monomer, the carboxyl group-containing acrylate monomer, and the amine group-containing monomer may be polymerized with each other at the time of forming an adhesive film including a cured product of the adhesive composition.

That is, an adhesive film to be described below may include a polymerization unit derived from an alkyl group-containing (meth)acrylate monomer, a polymerization unit derived from a cycloalkyl group-containing (meth)acrylate monomer, a polymerization unit derived from a carboxyl group-containing monomer, and a polymerization unit derived from an amine group-containing monomer.

Further, according to an exemplary embodiment of the present invention, the adhesive composition may be a solvent-free type adhesive composition.

That is, the adhesive composition may not include a solvent.

Therefore, an adhesive film including a cured product of the adhesive composition according to an exemplary embodiment of the present invention may be formed by bulk polymerization of the adhesive composition.

In addition, the polymerization method is not particularly limited, and the adhesive film may be formed by polymerizing the adhesive composition using a method such as thermal polymerization, photopolymerization, and dual polymerization of thermal polymerization and photopolymerization, which are generally known in the art.

According to an exemplary embodiment of the present invention, the adhesive composition may further include a polymerization initiator, if necessary. However, the type of polymerization initiator is not particularly limited, and the polymerization initiator may be freely selected among the general polymerization initiators in the art in order to initiate the polymerization reaction of the monomer included in the composition.

According to an exemplary embodiment of the present invention, the adhesive composition may further include a curing agent, if necessary. That is, an adhesive film, including a cured product of the adhesive composition, to be described below may be formed through a curing reaction of the adhesive composition.

Furthermore, the type of curing agent is not particularly limited, and the curing agent may be freely selected among the general curing agents known in the art.

In the present specification, the term "curing agent" may mean a compound which is used for inducing a curing reaction of a polymer, which is formed by generating a bridge bond between monomers, to improve the strength of the polymer.

In addition, the curing reaction of the adhesive composition may be performed simultaneously with the above-described polymerization reaction.

Furthermore, a method of the curing reaction is not particularly limited, and the adhesive film may be formed by curing the adhesive composition by a method such as thermal curing, photocuring, and dual curing of thermal curing and photocuring, which are generally known in the art.

According to an exemplary embodiment of the present invention, the adhesive composition may further include a crosslinking agent, if necessary. However, the type of crosslinking agent is not particularly limited, and the crosslinking agent may be freely selected among the crosslinking agents generally known in the art.

In the present specification, the term "crosslinking agent" may mean a compound which is used for generating a bridge bond between monomers to form a polymer.

According to an exemplary embodiment of the present invention, the amine group-containing monomer may be included in a content of 1 part by weight or more and 10 parts by weight or less, 1 part by weight or more and 7 parts by weight or less, 3 parts by weight or more and 10 parts by weight or less, or 3 parts by weight or more and 7 parts by weight or less, based on 100 parts by total weight of monomers.

Within the above range, the adhesive composition may provide an adhesive film capable of suppressing a change over time while minimizing the white turbidity phenomenon. Meanwhile, when the content of the amine group-containing monomer is less than 1 part by weight, a white turbidity phenomenon may occur to the adhesive film including the cured product of the adhesive composition. Moreover, when the content of the amine group-containing monomer is more than 10 parts by weight, the adhesive film including the cured product of the adhesive composition fails to sufficiently embed a step, and a value of the color difference (b*) may be large.

According to an exemplary embodiment of the present invention, the alkyl group-containing (meth)acrylate monomer may be included in a content of 60 parts by weight or more and 80 parts by weight or less, 60 parts by weight or more and 75 parts by weight or less, 65 parts by weight or more and 80 parts by weight or less, or 65 parts by weight or more and 75 parts by weight or less, based on 100 parts by total weight of monomers.

Within the above content range, the adhesive composition may provide an adhesive film which can have an excellent performance of suppressing white turbidity and alleviate a problem of change over time.

According to an exemplary embodiment of the present invention, the cycloalkyl group-containing (meth)acrylate monomer may be included in a content of 5 parts by weight or more and 20 parts by weight or less, 5 parts by weight or more and 15 parts by weight or less, 7 parts by weight or more and 20 parts by weight or less, or 7 parts by weight or more and 15 parts by weight or less, based on 100 parts by total weight of monomers.

Within the above range, the cycloalkyl group-containing (meth)acrylate monomer may be bonded to a fundamental framework formed by the alkyl group-containing (meth)acrylate monomer, thereby improving stability of the fundamental framework. Accordingly, the adhesive composition may provide an adhesive film having a high mechanical property and an adhesive property which does not deteriorate even in the change of the external environment.

According to an exemplary embodiment of the present invention, the carboxyl group-containing monomer may be included in a content of 5 parts by weight or more and 20 parts by weight or less, 5 parts by weight or more and 15 parts by weight or less, 7 parts by weight or more and 20 parts by weight or less, or 7 parts by weight or more and 15 parts by weight or less, based on 100 parts by total weight of monomers.

Within the above range, the carboxyl group-containing monomer may be bonded to each of the alkyl group-containing (meth)acrylate monomer, the cycloalkyl group-containing (meth)acrylate monomer, and the amine group-containing monomer, thereby imparting an adhesive property to the fundamental framework constituting the adhesive composition. Accordingly, the adhesive composition may have a high adhesive property, and may provide an adhesive film in which occurrence of white turbidity is suppressed without generating a phenomenon in which the adhesive property deteriorates due to the change in the external environment.

According to an exemplary embodiment of the present invention, the amine group-containing monomer may include at least one of dimethyl acrylamide, diacetone acrylamide, N-[3-(dimethylamino)propyl]methacrylamide, N-methyl-N-vinylacetamide, 2-(dimethylamino)ethyl acrylate, N-vinylpyrrolidone, 4-acryloylmorpholine, N-methacryloylmorpholine, N-isopropylacrylamide, 2-methyl-2-oxazoline, 2-ethyl-2-oxazoline, N-isopropyl-2-oxazoline, and ethyleneimine. Specifically, the amine group-containing monomer may include at least one of dimethyl acrylamide, diacetone acrylamide, N-[3-(dimethylamino) propyl]methacrylamide, and N-methyl-N-vinylacetamide, and more specifically, the amine group-containing monomer may include dimethyl acrylamide.

The adhesive composition may include the amine group-containing monomer as described above, thereby providing an adhesive film capable of suppressing an occurrence of a white turbidity phenomenon while solving a problem of a change characteristic over time contained in the adhesive composition in the related art.

Another exemplary embodiment of the present invention provides an adhesive film.

An exemplary embodiment of the present invention provides an adhesive film including a cured product of the adhesive composition.

According to an exemplary embodiment of the present invention, the adhesive film may be formed by bulk polymerization of the adhesive composition as described above.

In addition, according to an exemplary embodiment of the present invention, the adhesive film may be formed by curing the adhesive composition as described above. Furthermore, polymerization and/or curing of the adhesive composition may be simultaneously performed, as described above.

According to an exemplary embodiment of the present invention, the adhesive film may not include a hydroxyl group.

According to an exemplary embodiment of the present invention, the adhesive film may be formed by polymerizing the adhesive composition including the alkyl group-containing (meth)acrylate monomer, the cycloalkyl group-containing (meth)acrylate monomer, the carboxyl group-containing monomer, and the amine group-containing monomer.

According to an exemplary embodiment of the present invention, the adhesive film may include a polymer including a polymerization unit derived from the alkyl group-containing (meth)acrylate monomer, a polymerization unit derived from the cycloalkyl group-containing (meth)acrylate monomer, a polymerization unit derived from the carboxyl group-containing monomer, and a polymerization unit derived from the amine group-containing monomer.

According to an exemplary embodiment of the present invention, the adhesive film may have a gel content of 60% or more and 95% or less.

Within the above range, it is possible to provide an adhesive film which has excellent adhesive property and mechanical strength and can suppress a white turbidity phenomenon.

According to an exemplary embodiment of the present invention, the gel content may mean a content of a solid content included in the adhesive film.

That is, the gel content may mean a content of a solid phase non-volatile material included in the adhesive film, and may mean a content of the residue after the produced adhesive film is put into a solvent, soaked with the solvent, filtered with an iron network, and then dried.

More specifically, the gel content of the adhesive film may be measured through the above-described Equation 2.

According to an exemplary embodiment of the present invention, the adhesive film may satisfy the following Equation 1.

$$Y-X \leq 10 \quad \text{[Equation 1]}$$

In Equation 1, X means a gel content (%) after film formation of the adhesive film, and Y means a gel content (%) after 7 days incubation at 60° C. following the film formation of the adhesive film.

Specifically, the fact that the adhesive film satisfies Equation 1 may mean that an amount of increase in gel content of the adhesive film is not large even though time elapses. Accordingly, the fact that the adhesive film satisfies Equation 1 may mean that an excellent adhesive property of the adhesive film is not changed even according to the elapse of time, that is, a change characteristic over time is suppressed.

According to an exemplary embodiment of the present invention, the adhesive film may have a thickness of 25 μm or more and 250 μm or less, 25 μm or more and 200 μm or less, 25 μm or more and 150 μm or less, 50 μm or more and 250 μm or less, 50 μm or more and 200 μm or less, 50 μm or more and 150 μm or less, 100 μm or more and 250 μm or less, 100 μm or more and 200 μm or less, or 100 μm or more and 150 μm or less.

Within the above range, the adhesive film may enhance commercial availability by decreasing the total thickness of the above-described display device, and may allow the cover member to be sufficiently bonded to the display member.

According to an exemplary embodiment of the present invention, a glass transition temperature of the adhesive film may be −40° C. to −20° C.

According to an exemplary embodiment of the present invention, the glass transition temperature (Tg) of the adhesive film may be a value determined as a middle point of a DSC curve by warming the adhesive film at a heating rate of 5° C./min within a temperature range of −70° C. to 100° C. using a differential scanning calorimeter (DSC) (Q-1000, manufactured by TA Instrument Inc.) and measuring the temperature.

Within the above range, the adhesive film has an advantage in that during the work of laminating the members using the adhesive film, the adhesive film is easily handled.

Still another exemplary embodiment of the present invention provides an adhesive film prepared by using the adhesive composition.

According to an exemplary embodiment of the present invention, the adhesive film may be prepared by curing the adhesive composition. Further, the curing method is not particularly limited, and it is possible to use a method such as thermal curing, photocuring, and thermal-photo dual curing, which are generally known in the art.

That is, the adhesive film may include a cured product of the adhesive composition prepared by curing the adhesive composition.

Still yet another exemplary embodiment of the present invention provides a multilayer adhesive sheet.

An exemplary embodiment of the present invention provides a multilayer adhesive sheet sequentially including: a first outer adhesive film; an intermediate adhesive film; and a second outer adhesive film, in which the intermediate adhesive film includes the adhesive film. The intermediate adhesive film may be the adhesive film prepared by curing the adhesive composition according to an exemplary embodiment of the present invention.

The multilayer adhesive sheet has advantages in that excellent reworkability and step embeddability may be secured, and problems of an occurrence of white turbidity and a change over time are solved.

According to an exemplary embodiment of the present invention, a first outer adhesive polymer included in the first outer adhesive film may be formed by solution polymerization of a first outer adhesive composition including an alkyl group-containing (meth)acrylate monomer and a polar functional group-containing monomer.

Further, a second outer adhesive polymer included in the second outer adhesive film may be formed by solution polymerization of a second outer adhesive composition including an alkyl group-containing (meth)acrylate monomer and a polar functional group-containing monomer.

Specifically, the outer adhesive polymer may be prepared through thermal polymerization and/or photopolymerization of the composition. Specifically, the outer adhesive polymer may be prepared through thermal polymerization and/or photopolymerization of the composition. In addition, a composition for forming the outer adhesive polymer may further include a crosslinking agent, an initiator, a tackier, and the like, which are generally used in the art, if necessary.

According to an exemplary embodiment of the present invention, the first outer adhesive film and the second outer adhesive film may be formed by using compositions having the same composition. Furthermore, according to an exemplary embodiment of the present invention, the first outer adhesive film and the second outer adhesive film may have the same thickness.

According to an exemplary embodiment of the present invention, the multilayer adhesive sheet may further include: a first interface mixture film provided between the first outer adhesive film and the intermediate adhesive film; and a second interface mixture film provided between the second outer adhesive film and the intermediate adhesive film.

Specifically, the first interface mixture layer may include both a material constituting the first outer adhesive film and a material constituting the intermediate adhesive film, and the second interface mixture layer may include both a material constituting the second outer adhesive film and a material constituting the intermediate adhesive film.

According to an exemplary embodiment of the present invention, the multilayer adhesive sheet may be prepared by sequentially laminating and then simultaneously curing a first outer adhesive composition, the adhesive composition, and a second outer adhesive composition. Furthermore, the multilayer adhesive sheet may be prepared by sequentially laminating and then simultaneously photocuring a first outer adhesive composition, the adhesive composition, and a second outer adhesive composition.

The first outer adhesive composition may constitute the first outer adhesive film after curing, the adhesive composition may constitute the intermediate adhesive film after curing, and the second outer adhesive composition may constitute the second outer adhesive film after curing.

Specifically, since the multilayer adhesive sheet is prepared by a method of laminating liquid-phase compositions, and then simultaneously curing the compositions, instead of a method of separately preparing the respective layers, and then bonding the layers, a liquid mixing section between the respective layers may occur. The multilayer adhesive sheet may secure excellent interlayer attaching force by the liquid mixing section as compared to a general multilayer adhesive sheet, and may prevent an interface separation phenomenon between layers even in an extremely low temperature environment.

According to an exemplary embodiment of the present invention, an interface layer caused by liquid mixing may be present at each of the interface between the first outer adhesive composition and the intermediate adhesive composition and the interface between the intermediate adhesive composition and the outer adhesive composition. Specifically, the interface layer caused by liquid mixing at the interface between the first outer adhesive composition and the intermediate adhesive composition may constitute the first interface mixture layer after curing. Further, the interface layer caused by liquid mixing at the interface between the intermediate adhesive composition and the second outer adhesive composition may constitute the second interface mixture layer after curing. The intermediate adhesive composition may mean being the same as the adhesive composition.

According to an exemplary embodiment of the present invention, the first outer adhesive composition, the intermediate adhesive composition, and the second outer adhesive composition may be sequentially applied onto a substrate. In addition, the first outer adhesive composition, the intermediate adhesive composition, and the second outer adhesive composition may be simultaneously and sequentially applied onto a substrate. As a method of applying the adhesive composition, a method generally used in the art, such as slot die and lip die, may be used.

According to an exemplary embodiment of the present invention, the multilayer adhesive sheet may be formed by a lamination process after curing each of the intermediate adhesive composition and the outer adhesive compositions into a film. Specifically, the multilayer adhesive sheet may be prepared by separately preparing a first outer adhesive film, an intermediate adhesive film, and a second outer adhesive film in the form of a film, sequentially laminating these films, and then compressing the resulting laminate.

However, a method of preparing the multilayer adhesive sheet is not limited thereto, and the multilayer adhesive sheet may be prepared by using a preparation method generally applied in the art.

Hereinafter, the present invention will be described in detail with reference to Examples for specifically describing the present invention. However, the Examples according to the present invention may be modified in various forms, and it is not interpreted that the scope of the present invention is limited to the Examples to be described below. The Examples of the present specification are provided for more completely explaining the present invention to a person with ordinary skill in the art.

<Preparation of Adhesive Composition>

Example 1

An adhesive composition including 75 parts by weight of 2-ethylhexyl acrylate, 10 parts by weight of isobornyl methacrylate, 10 parts by weight of acrylic acid, and 5 parts by weight of dimethyl acrylamide as monomers, 0.2 part by weight of a photoinitiator (Irgacure 651, manufactured by Ciba Specialty Chemicals Co., Ltd.), 0.1 part by weight of a curing agent (hexadioldiacrylate, HDDA), and 1 part by weight of a crosslinking agent (SUO-1020, manufactured by SHIN-A T&C) was prepared.

Example 2

An adhesive composition was prepared in the same manner as in Example 1, except that 70 parts by weight of 2-ethylhexyl acrylate, 10 parts by weight of isobornyl methacrylate, 10 parts by weight of acrylic acid, and 10 parts by weight of dimethyl acrylamide were included as monomers.

Comparative Example 1

An adhesive composition was prepared in the same manner as in Example 1, except that 80 parts by weight of 2-ethylhexyl acrylate, 10 parts by weight of isobornyl methacrylate, and 10 parts by weight of acrylic acid were included as monomers.

Comparative Example 2

An adhesive composition was prepared in the same manner as in Example 1, except that 68 parts by weight of 2-ethylhexyl acrylate, 10 parts by weight of isobornyl methacrylate, 5 parts by weight of dimethyl acrylamide, 7 parts by weight of hydroxybutyl acrylate, and 10 parts by weight of acrylic acid were included as monomers.

Comparative Example 3

An adhesive composition was prepared in the same manner as in Example 1, except that 70 parts by weight of 2-ethylhexyl acrylate, 10 parts by weight of isobornyl methacrylate, 3 parts by weight of dimethyl acrylamide, 7 parts by weight of hydroxybutyl acrylate, and 10 parts by weight of acrylic acid were included as monomers.

Comparative Example 4

An adhesive composition was prepared in the same manner as in Example 1, except that 73 parts by weight of 2-ethylhexyl acrylate, 10 parts by weight of isobornyl methacrylate, 7 parts by weight of hydroxybutyl acrylate, and 10 parts by weight of acrylic acid were included as monomers.

Comparative Example 5

An adhesive composition was prepared in the same manner as in Example 1, except that 72 parts by weight of 2-ethylhexyl acrylate, 10 parts by weight of isobornyl methacrylate, 5 parts by weight of dimethyl acrylamide, 3 parts by weight of hydroxybutyl acrylate, and 10 parts by weight of acrylic acid were included as monomers.

Comparative Example 6

An adhesive composition was prepared in the same manner as in Example 1, except that 68 parts by weight of 2-ethylhexyl acrylate, 10 parts by weight of isobornyl methacrylate, 5 parts by weight of dimethyl acrylamide, 7 parts by weight of hydroxyethyl acrylate, and 10 parts by weight of acrylic acid were included as monomers.

Comparative Example 7

An adhesive composition was prepared in the same manner as in Example 1, except that 72 parts by weight of 2-ethylhexyl acrylate, 10 parts by weight of isobornyl methacrylate, 5 parts by weight of dimethyl acrylamide, 3 parts by weight of hydroxyethyl acrylate, and 10 parts by weight of acrylic acid were included as monomers.

The summary of components and contents of the monomers in Example 1 and Comparative Examples 1 to 7 is as in the following Table 1.

TABLE 1

|  | 2-EHA | IBOMA | DMAA | HBA | HEA | AA |
|---|---|---|---|---|---|---|
| Example 1 | 75 | 10 | 5 | — | — | 10 |
| Example 2 | 70 | 10 | 10 | — | — | 10 |
| Comparative Example 1 | 80 | 10 | — | — | — | 10 |
| Comparative Example 2 | 68 | 10 | 5 | 7 | — | 10 |
| Comparative Example 3 | 70 | 10 | 3 | 7 | — | 10 |
| Comparative Example 4 | 73 | 10 | 0 | 7 | — | 10 |
| Comparative Example 5 | 72 | 10 | 5 | 3 | — | 10 |
| Comparative Example 6 | 68 | 10 | 5 | — | 7 | 10 |
| Comparative Example 7 | 72 | 10 | 5 | — | 3 | 10 |

* Unit: parts by weight
* 2-EHA: 2-ethylhexyl acrylate
* IBOMA: isobornyl methacrylate
* DMAA: dimethyl acrylamide
* HBA: hydroxybutyl acrylate
* HEA: hydroxyethyl acrylate
* AA: acrylic acid <Preparation and Evaluation of Adhesive Film>

Adhesive films were prepared by UV-curing the adhesive compositions according to Examples 1 and 2 and Comparative Examples 1 to 7.

The results of evaluating physical properties of the adhesive films are as in the following Table 2.

TABLE 2

|  | ① | ② | ②-① | Evaluation of change over time | Evaluation of performance of suppressing white turbidity |
|---|---|---|---|---|---|
| Example 1 | 76 | 76.1 | 0.1 | ○ | Δ |
| Example 2 | 77 | 77.2 | 0.2 | ○ | ○ |
| Comparative Example 1 | 73 | 73.3 | 0.3 | ○ | X |
| Comparative Example 2 | 87 | 97.3 | 10.3 | X | ◎ |
| Comparative Example 3 | 85 | 96.8 | 11.8 | X | ○ |
| Comparative Example 4 | 85 | 96.2 | 11.2 | X | X |
| Comparative Example 5 | 80 | 95.6 | 15.6 | X | ○ |
| Comparative Example 6 | 82 | 95.3 | 13.3 | X | ◎ |
| Comparative Example 7 | 78 | 95.1 | 17.1 | X | ○ |

In Table 2, ① means a gel content after the adhesive film is film-formed, and ② indicates a gel content after the adhesive film is film-formed and then left to stand at a temperature of 60° C. for 7 days.

Further, a gel content after the adhesive film was film-formed and a gel content after the adhesive film was film-formed and then was left to stand at 60° C. for 7 days were measured according to the method shown in the above-described Equation 2.

Evaluation of Change Over Time

The change over time was evaluated based on the difference in gel content between after the adhesive film was is film-formed and after the adhesive film is film-formed and then left to stand at 60° C. for 7 days, specifically, an amount of increase in gel content of the film-formed adhesive film after being left to stand at 60° C. for 7 days. More specifically, the case where an amount of increase in gel content after the adhesive film was film-formed and then left to stand at 60° C. for 7 days was more than 10% was indicated as X, and the case where an amount of increase in gel content after the adhesive film was film-formed and then left to stand at 60° C. for 7 days was 10% or less was indicated as O.

Evaluation of Performance of Suppressing White Turbidity

The adhesive film was attached onto a glass substrate having a thickness of 1.1 T by using a 2 kg roller, and a glass substrate having a thickness of 0.55 T was laminated thereon. And, the laminate was left to stand in an autoclave under the conditions of 40° C. and 4 bar, and then was irradiated with an ultraviolet ray with an intensity of 3 J. Furthermore, the test specimen after the irradiation with ultraviolet ray was placed into an oven under the conditions of a temperature of 80° C. and a relative humidity of 95RH %, and it was confirmed by the unaided eye whether the white turbidity occurred after 3 days.

The case where the area of white turbidity occurred as compared to the total area of the glass substrate was 10% or less was indicated as ◎, the case where the area of white turbidity occurred as compared to the total area of the glass substrate was more than 10% and 30% or less was indicated as ○, the case where the area of white turbidity occurred as compared to the total area of the glass substrate was more than 30% and 70% or less was indicated as Δ, and the case where the area of white turbidity occurred as compared to the total area of the glass substrate was more than 70% was indicated as X.

Further, the cases where the evaluation of performance of suppressing the white turbidity was indicated with ◎, ○, and Δ secured commercial availability, so that it was determined that the adhesive film could be used for a display device.

According to the result in Table 2, it could be confirmed that the adhesive film according to Example 1 could suppress the change over time by not including hydroxyl group-containing monomer, and had performance of suppressing white turbidity enough to secure commercial availability by including the amine group-containing monomer within the range according to an exemplary embodiment of the present invention. In addition, it could be confirmed that the adhesive film according to Example 2 could suppress the change over time, and had the excellent performance of suppressing white turbidity.

In contrast, it could be confirmed that Comparative Example 1 not including amine group-containing monomer could suppress the change over time, but failed to secure the performance of suppressing white turbidity, and the commercial availability thereof deteriorated.

It could be confirmed that in the case of Comparative Examples 2 to 7 where included the amine group-containing monomer, but did not exclude the hydroxyl group-containing monomer, there was a case where a performance of suppressing white turbidity could be secured, but all of the adhesive films according to Comparative Examples 2 to 7 failed to suppress the change over time, and the adhesive strength thereof deteriorated when the adhesive films were exposed to extreme conditions of high temperature and high humidity.

In summary, it could be confirmed that only when the hydroxyl group-containing monomer was not included and the amine group-containing monomer was included within the range according to an exemplary embodiment of the present invention, an adhesive film capable of suppressing white turbidity and change over time could be provided.

Furthermore, in the case of preparing a multilayer adhesive sheet including the adhesive film according to an exemplary embodiment of the present invention as an intermediate adhesive film, it is possible to sufficiently expect that the multilayer adhesive sheet has excellent step embeddability and reworkability.

The invention claimed is:

1. An adhesive film comprising a cured product of an adhesive composition,
wherein the adhesive composition comprises:
an alkyl group-containing (meth)acrylate monomer,
a cycloalkyl group-containing (meth)acrylate monomer,
a carboxyl group-containing monomer, and
an amine group-containing monomer,
wherein the amine group-containing monomer is in a content of 1 part by weight or more and 10 parts by weight or less based on 100 parts by a total weight of monomers, wherein the carboxyl group-containing monomer is in a content of 5 parts by weight or more and 20 parts by weight or less based on 100 parts by the total weight of the monomers, and wherein the adhesive composition does not include a hydroxy group containing monomer, and wherein the amine group-containing monomer comprises at least one of dimethyl acrylamide, diacetone acrylamide, N[3-(dimethylamino)propyl]methacrylamide, N-methyl-N-vinylacetamide, 2-(dimethylamino)ethyl acrylate, 4-acryloylmorpholine, N-methacryloylmorpholine, N-isopropylacrylamide, 2-methyl-2-oxazoline, 2-ethyl-2-oxazoline, N-isopropyl-2-oxazoline, or ethyleneimine, wherein the adhesive film satisfies the following Equation 1:

$$Y-X \leq 10 \quad \text{[Equation 1]}$$

wherein

X means a gel content (%) after film formation of the adhesive film, and

Y means a gel content (%) after 7 days incubation at 60° C. following the film formation of the adhesive film.

2. The adhesive film of claim 1, wherein the alkyl group-containing (meth)acrylate monomer is in a content of 60 parts by weight or more and 80 parts by weight or less based on 100 parts by the total weight of the monomers.

3. The adhesive film of claim 1, wherein the cycloalkyl group-containing (meth)acrylate monomer is in a content of 5 parts by weight or more and 20 parts or less by weight based on 100 parts by the total weight of the monomers.

4. The adhesive film of claim 1, wherein the adhesive composition is a solvent-free type adhesive composition.

5. The adhesive film of claim 1, wherein a gel content of the adhesive film is 60% or more and 95% or less.

6. The adhesive film of claim 1, wherein the adhesive film has a thickness of 25 μm or more and 250 μm or less.

7. The adhesive film of claim 1, wherein a glass transition temperature of the adhesive film is −40° C. to −20° C.

* * * * *